United States Patent [19]
Kemp et al.

[11] 3,879,364
[45] Apr. 22, 1975

[54] POLYMERIZATION OF VINYL CHLORIDE POLYMERS AND COPOLYMERS AND PRODUCTS

[75] Inventors: Thomas Kemp, Bois-Colombes; Leon Badguerahanian, Montlignon, both of France

[73] Assignee: Products Chimiques Pechiney-Saint-Gobain, Neuilly-sur-Seine, France

[22] Filed: July 18, 1973

[21] Appl. No.: 380,354

Related U.S. Application Data

[63] Continuation of Ser. No. 7,359, Jan. 30, 1970, abandoned, which is a continuation of Ser. No. 608,495, Jan. 11, 1967, abandoned.

[30] Foreign Application Priority Data
Jan. 19, 1966  France ............................. 66.46461
Nov. 30, 1966  France ............................. 66.85628

[52] U.S. Cl...... 260/92.8 W; 260/85.5 A; 260/86.3; 260/87.1; 260/87.7
[51] Int. Cl. .............................................. C08f 1/11
[58] Field of Search............ 260/92.8 W, 87.7, 87.1, 260/86.3, 85.5 XA

[56] References Cited
UNITED STATES PATENTS
3,324,097  6/1967  Pears .................................. 260/92.8
3,383,346  5/1968  Smith ................................... 260/23
3,725,367  4/1973  Kemp ............................. 260/80.81

*Primary Examiner*—Joseph L. Schofer
*Assistant Examiner*—John Kight

[57] ABSTRACT

The invention is addressed to the continuous polymerization of vinyl chloride or vinyl chloride copolymers in the process of suspension or fine suspension wherein a seeding product is first prepared by polymerization or copolymerization of vinyl chloride after which the seeding product is introduced at a continuous rate with water, monomer or a mixture of monomers into a reaction zone which is reacted under autogeneous pressure to effect the desired polymerization with the continuous withdrawal of product and in which the amount of catalyst embodied in the preparation of the seeding product is sufficient to supply the catalyst necessary for the main polymerization or copolymerization whereby a controlled continuous polymerization product is made available to produce a more uniform polymer or copolymer.

9 Claims, No Drawings

POLYMERIZATION OF VINYL CHLORIDE POLYMERS AND COPOLYMERS AND PRODUCTS

This is a continuation of copending application Ser. No. 7,359, filed Jan. 30, 1970, which in turn is a continuation of Ser. No. 608,495, filed Jan. 11, 1967, both applications are now abandoned.

This invention relates to vinyl chloride polymers and copolymers and more particularly to a continuous process for the preparation of polymers and copolymers of vinyl chloride by suspension polymerization or copolymerization and by fine suspension polymerization or copolymerization.

It is known that, during polymerization or copolymerization of vinyl chloride in suspension, it is difficult to suppress the rapid formation of incrustations on the heat transfer surfaces. These incrustations are poor heat conductors and they interfere with efficient heat transfer, especially in the step of cooling of the reaction mass to terminate the reaction. In discontinuous operations, the incrustations can be eliminated between operations but in continuous operations, the incrustations continue to build up on the walls into substantial deposits which interfere with the desired heat transfer charactertics whereby the polymerization or copolymerization process becomes uncontrollable and yields a poor quality and/or heterogeneous polymers.

The conventional catalysts used in polymerization of vinyl chloride, such as organic peroxides, endow the reaction with a kinetics of exponential value whereby cooling becomes difficult at the end of the reaction. Such catalysts are not used completely with the result that use must be made of substantial amounts of catalyst in the attempt to speed the polymerization for operation on a commercial scale whereby, at the end of the reaction, catalyst remains in the reaction medium.

It is also known that in polymerization or copolymerization in suspension, and especially in fine suspension, the concentration of particles cannot exceed a certain maximum without bulking the suspension or coagulation of the particles in fine suspension.

It is an object of this invention to provide a process for continuous polymerization or copolymerization of vinyl chloride in aqueous suspension or fine suspension, in which the reaction proceeds at a desired normal rate, in which optimum utilization is made of the polymerization catalyst, in which a high concentration of polymers or copolymers of good quality and uniform molecular weight distribution can be procured, and in which the reaction is capable of being controlled for production of a more desirable product.

In accordance with the practice of this invention, the continuous polymerization or copolymerization of vinyl chloride in aqueous suspension or fine suspension comprises the simultaneous introduction into a reaction zone of water, a monomer or mixture of monomers, and previously prepared product containing catalyst (hereinafter referred to as the seeding product), and maintaining the mixture at a temperature for polymerization over a period of time required for its polymerization, and finally continuously removing polymer or copolymer from the reaction zone.

By the term "mixture of monomers" is meant a mixture containing at least 50% by weight vinyl chloride with at least one other monomer capable of copolymerization with vinyl chloride, in which the copolymerizable monomer is selected of the monomers generally employed in conventional processes, such as vinyl acetate, vinylidene chloride, acrylonitrile, methyl methacrylate, ethyl acrylate and the like unsaturated monomer.

As used herein, the term "polymer" is meant to include homopolymers or copolymers of vinyl chloride in which the homo- and/or copolymer is obtained by polymerization or copolymerization reaction. The prepolymer used to seed the mixture for continuous polymerization, in accordance with the practice of this invention, is prepared by the usual methods of polymerization in suspension or in fine suspension. It occurs in the form of suspended particles of polymer for polymerization in suspension and in the form of a latex of polymer particles for polymerization in fine suspension. The particles are of an average diameter within the range of 20 to 200 $\mu$ for the suspension and 0.05 to 1.5 $\mu$ for the latex.

The seed suspension is prepared of a suspension formed of water, vinyl chloride or a mixture of monomers, a dispersing agent and catalyst. In order to prevent bulking of the polymer, it is desirable to make use of a monomer or mixture of monomers in an amount less than 37% by weight of the total reaction mixture. The suspension is heated with stirring at autogeneous pressure at a temperature which is determined by the product desired to be obtained. When the pressure drops, the reaction is discontinued and unconverted monomer or monomers are removed by degassing.

In the preparation of the seed latex, use is made of a fine suspension of water, vinyl chloride or a mixture of monomers, a dispersing agent and catalyst. To prevent coagulation of the formed polymer, it is desirable to make use of the monomer or mixture of monomers in an amount less than 47% by weight of the total reaction mixture. The vinyl chloride or mixture of monomers is finely dispersed in the aqueous medium by mechanical means, such as by a colloid mill, high speed pump, vibratory stirrer or ultrasonic means. The fine suspension obtained is heated under autogeneous pressure and with moderate agitation to a temperature which again is dependent on the characteristics of the product desired to be obtained. When the pressure falls, the reaction is terminated and the unconverted monomer or monomers are removed by degassing.

As the dispersing agent, a protective colloid is used in the suspension system and an anionic surface active agent or emulsifier is used in the fine suspension. The protective colloid is of the type usually employed in conventional polymerizations in suspension, such as polyvinyl alcohol, methylcellulose, carboxycellulose and gelatin. Such protective colloid is used alone or in admixture in an amount within the range of 0.05% to 2% by weight of the monomer or mixture of monomers. The anionic emulsifying agent can be represented by alkylarylsulfonates, alkylsulfates and the fatty acid salts fo alkali metals. They may be used alone or in admixture one with another or with a non-ionic emulsifying agent such as fatty alcohols or polyoxyethylene alkylphenols, with the emulsifying component present in an amount within the range of 0.3% to 4% by weight of the monomer or mixture of monomers. The amount of dispersing agent may vary beyond the limits described without departing from the spirit of the invention.

As the catalyst employed in the preparation of the seed compound, use can be made of catalytic compounds insoluble in aqueous medium but soluble in the monomer or mixture of monomers. For this purpose, use can be made of the organic peroxides, such as lauroyl peroxide, tertiobutyl diethylperacetate, diethylhexylpercarbonate, diacetylperoxide and the like. The selection of catalyst depends somewhat on its rate of decomposition at the temperature that is adopted for the reaction. The catalyst must be sufficiently reactive to enable use of normal amounts within the range of 0.1% to 3% by weight of the monomer or mixtures of monomers for carrying out the preparation of the seed product within a period of time ranging from 4 to 20 hours. However, the rate of decomposition of the catalyst should not be so great that the quantity of catalyst decomposed in the preparation of the seeding compound will exceed 50% of the amount of catalyst introduced. For this purpose, it is necessary to select a catalyst the half-time life of which is such that the ratio of destroyed catalyst during the preparation of the seed product is between 5% to 50% by weight of the catalyst used. This represents an important concept of this invention.

In the event that several catalysts are used, it is desirable to make use of catalysts having different reactivation whereby the more reactive catalyst is effective principally during the preparation of the seed product while the less reactive catalyst remains for reaction during the main polymerization or copolymerization of vinyl chloride.

In accordance with the practice of this invention, the seed product is introduced at a rate, i.e., the weight ratio of polymer in the seed product to the monomer or mixture of monomers plus polymer from the seed product, between 0.01 and 0.5. Seeding at a ratio above 0.5 is of very little value because the quantity of seed product becomes too great by comparison with the monomer or mixture of monomers whereby the advantages of the process become greatly minimized. A seeding ratio below 0.01 is also of little interest because the quantity of reactive catalyst introduced with the seed product becomes too small and is incapable of polymerization of the vinyl chloride or mixture of monomers at a commercially desirable rate. The catalyst present in excess in the seed mixture is thus used to catalyze the polymerization of the vinyl chloride or mixtures of monomers and it is desirable to have an amount of catalyst available for reaction in an efficient manner and at an established uniform reaction rate.

In accordance with the practice of this invention, the quantity of water employed in the continuous polymerization is calculated, taking into account the amount of water introduced from the seed product, to provide a composition in which the polymer of the seed product and the monomer or mixture of monomers is within the range of 20 to 50% by weight of the total mixture for polymerization in suspension and within the range of 20 to 60% by weight for polymerization in fine suspension.

By way of modification, a dispersing agent may be added to the polymerization reaction mixture. The dispersing agent can be the same as the agent used in the preparation of the seed product. When used, such dispersing agent is employed in an amount within the range of 0.05 to 2% by weight of the monomer or mixture of monomers.

The various components are preferably separately introduced continuously into the reaction zone. In order to reduce the number of separate feedings, it is possible to premix the water with the seed product and/or the dispersing agent. Premixing has the advantage of making it easier to manipulate the diluted seed product.

In the reaction zone, the suspension or fine suspension is heated under autogeneous pressure to the polymerization temperature which depends upon the properties of the polymer desired to be obtained. The temperature used is within the range of 10° to 85°C, and preferably between 40° to 80°C. These same temperatures are used in the preparation of the seed product. Often times it is desirable to prepare the seed product at a temperature differing from that used in the main polymerization reaction, and particularly at a lower temperature but while still remaining within the limit of temperature for a sufficient rate of decomposition of the catalyst used in the seed reaction.

The suspension or fine suspension is maintained in the reaction zone for a period of time for maximal polymerization of the monomer or mixture of monomers with the time being inversely proportional to the amount of seed product introduced into the reaction zone. The polymer in suspension or in fine suspension is recovered continuously from the reaction zone.

The continuous polymerization process of this invention affords a number of advantages including the small consumption of catalyst, more uniform reaction, less time for reaction, the non-existence of incrustations in the reaction zone thereby to facilitate heat transfer and more homogeneous polymerization, and a high concentration of polymer which can be as great as 47 to 57% by weight in the suspension or fine suspension, respectively. It will be understood that the described continuous process of polymerization in suspension or in fine suspension can be practiced as a discontinuous process.

The polymer formed can be separated from the polymerization medium withdrawn from the reaction zone by known techniques, such as filtration, decantation, centrifugal separation, atomization, coagulation and the like.

The invention also includes the polymers and copolymers of vinyl chloride obtained in accordance with the process of this invention. These polymers and copolymers occur in the form of powders in which the average diameter corresponds to that of the particles of the seed product multiplied by a factor of linear enlargement G, which, for an entire transformation, may be calculated by the formula:

$$G_t = \sqrt[3]{\frac{\text{weight of the monomer or mixture of monomers} + \text{weight of the polymer of seed product}}{\text{weight of the polymer of seed product}}}$$

The practical enlargement is: $G_p = G_t \sqrt[3]{T}$

T being the rate of transformation.

The concepts of this invention include the use of the polymers and copolymers of vinyl chloride in the preparation of products such as sheets, films, threads, hollow articles and molded materials obtained by calendering, extrusion, blown extrusion, injection molding, pressure molding and the like. Further, the invention relates more particularly to plastisols formulated of polymers obtained by polymerization in fine suspension. Examples of the practice of this invention will hereinafter be given by way of illustration, but not by way of limitation.

EXAMPLE 1

Preparation of seed latex:

400 kg vinyl chloride, 1.2 kg lauroyl peroxide, 4 kg sodium dodecylbenzene sulfonate and water added in an amount such that the vinyl chloride concentration will constitute 40% by weight of the mixture. This mixture is homogenized to a fine suspension and thereafter the fine suspension is placed into an autoclave of 1,200 liter capacity. The fine suspension is heated to 52°C under autogeneous pressure. After the fall of pressure, after about 9 hours, the heating is stopped and the unreacted vinyl chloride is removed by degassing. An 85% by weight yield based upon the vinyl chloride used was obtained, and the formed latex had a polyvinyl chloride concentration of 36% by weight. The particles had an average diameter of about 05 $\mu$. This operation is carried out each time that it is necessary for the continuous polymerization hereinafter described.

Continuous polymerization in fine suspension:

Use is made of a column of 500 liter capacity fitted with a double jacket for the circulation of water for heating or cooling. At its upper end portion, the column is provided with inlets for the introduction of seed latex, vinyl chloride, water containing emulsifier and its lower portion is provided with an outlet passage for the formed latex.

The column is filled with a latex from a preceding operation. The latex was heated to 52°C and the ingredients were continuously introduced with the following hourly flow:

14 kg seed latex prepared as described in Example 1 containing 5 kg polyvinyl chloride
25 kg vinyl chloride
11 kg water
0.25 kg sodium dodecylbenzene sulfonate This gave:
a seeding ratio of 0.16,
a concentration of vinyl chloride + polyvinyl chloride from the seeding latex of 60% by weight based upon the total fine suspension;
a catalyst percentage of 0.057% based upon the total vinyl chloride of monomer + monomer of the seed latex, by taking into account the unreacted 15%.

The fine suspension was maintained at 52°C under autogeneous pressure.

The removal of the formed latex was carried out continuously. Hourly, a latex containing 25.2 kg polyvinyl chloride was recovered, i.e., a concentration of 55.5% by weight of which 5 kg are derived from the seed product and 20.2 kg from the vinyl chloride introduced into the reaction zone. This corresponds to a transformation rate of 80.8% by weight.

Under these conditions, the productivity of the plant was 40 kg/m³/h of polyvinyl chloride.

The temperature differential between the inside of the column and inside of the double jacket was 10°C at the start of the operation and only 13°C after 500 hours of continuous operation. This indicates that the cooling efficiency is maintained during the continuous operation by reason of the fact that practically no incrustation forms on the surfaces.

It has been established that the very thin film of polyvinyl chloride covering the walls of the column represents only 0.016% by weight of the vinyl chloride introduced into the reaction. This is not significant for such high productivity.

The first portion of the latex obtained was atomized. Polyvinyl chloride was obtained in which the particles had an average diameter of 0.85 $\mu$, a coefficient of viscosity of 140, measured with the French norm T 51-013, and a moisture content of 1%.

A plastisol prepared by mixing 60 parts by weight of the polyvinyl chloride of Example 1 and 40 parts by weight of dioctyl phthalate had a viscosity of 3,000 cps as measured with the Drage viscometer. After 10 days this viscosity rose to only 5,000 cps.

In a subsequent portion of the latex, the polyvinyl chloride was separated by centrifugal separation and thereafter dried at 60°C. The polyvinyl chloride had an average diameter and a coefficient of viscosity which was the same as that obtained in the previous latex but the moisture content was only 0.1% by weight. With regard to the plastisol formed in the same manner as previously described, the viscosity was identical with that of the preceding plastisol.

In a similar test, vinyl chloride was introduced through the lower portion of the column instead of the upper portion and similar results were still obtained.

EXAMPLE 2

Preparation of the seed suspension:

Into an autoclave having a capacity of 1,000 liters, 300 kg of vinyl chloride, 1,200 kg polyvinyl alcohol, 600 g lauroyl peroxide and water were added with the water added in an amount to provide a monomer concentration of 33.3% by weight. The mixture was heated to 55°C with agitation and under autogeneous pressure. After the pressure dropped, the heating was discontinued and the unreacted vinyl chloride was removed by degassing. An 85% by weight yield was obtained based upon the vinyl chloride introduced into the reaction, i.e., the suspension obtained had a polyvinyl chloride concentration of 29.8% by weight. The average diameter of the particles was 70 $\mu$.

Continuous copolymerization in suspension:

Into an autoclave of 1,000 liters capacity, fitted with inlets for the seed suspension, vinyl chloride and water and an evacuation pipe for removal of suspension formed and with an agitator running at 50 rpm, 1,000 liters of polymer suspension from a preceding operation were introduced. The suspension was heated to 61°C and thereafter the reaction product was introduced continuously with the following hourly flows:

40.2 kg of the seed suspension prepared above containing 12 kg polyvinyl chloride, 60 kg vinyl chloride and 79.8 kg water.

This gave:
a seeding ratio of 0.16;
a concentration of vinyl chloride + polyvinyl chloride of the seed suspension of 40% by weight based upon the total suspension;
a catalyst percentage of 0.039% based upon the total used vinyl chloride (monomer + monomer of the seed suspension, by taking into account the unreacted 15%).

The temperature was maintained at 61°C under autogeneous pressure.

Hourly, a suspension containing 64.2 kg polymer was recovered, i.e., a concentration of 37.2% by weight, 12 kg of which is derived from the seed product and 52.2 kg from the vinyl chloride put into the reaction. This corresponds to a conversion rate of 87% by weight.

After filtration of the polymer suspension withdrawn and drying, a polyvinyl chloride in the form of a powder was obtained having an average diameter of 120 μ and the polyvinyl chloride had a coefficient of viscosity of 100.

After 300 hours of continuous operation, the process was stopped. The very thin film of polymer on the walls of the autoclave represented only 0.015% by weight of the vinyl chloride introduced into the reaction.

EXAMPLE 3

Preparation of the seed suspension:

Into an autoclave of 1,200 liter capacity, 294 kg vinyl chloride, 56 kg vinyl acetate, 1.05 kg polyvinyl alcohol, 600 g tertisobutyldiethylperacetate and water were added with the water added in an amount to provide a concentration of monomer of about 35% by weight. The mixture was heated under agitation to 72°C and this temperature was maintained for 10 hours. The heating was stopped and the unreacted monomers were removed by degassing. A yield of 85% by weight based upon the monomers introduced was obtained, i.e., the suspension had a copolymer concentration of 31.1% by weight containing 13% by weight vinyl acetate. The average diameter of the particles was 70 μ.

Continuous copolymerization in suspension:

In the same column used in Example 1, fitted with an agitator rotating at 60 rpm, 500 liters of a copolymer suspension from a preceding operation were introduced.

The suspension was heated to 75°C and thereafter the ingredients were introduced continuously at the following hourly flow:

4.8 kg of the seed suspension corresponding to 1.5 kg copolymer,
14.0 kg vinyl chloride,
2.7 kg vinyl acetate,
24.4 kg water,
0.32 kg polyvinyl alcohol.

This gives:
a seeding ratio of 0.082;
a concentration of vinyl chloride + vinyl acetate + copolymer of the seeding suspension of 36.3% by weight based on the total suspension;
a catalyst percentage of 0.016% based on the total vinyl chloride and vinyl acetate used (monomers + monomers of the seeding suspension, by taking into account the unreacted 15%).

The suspension was maintained at 75°C under autogeneous pressure. At the lower part of the column a suspension containing 15.5 kg copolymer was recovered hourly, i.e., a concentration of 35.8% by weight of which 1.5 kg is derived from the seed product and 14 kg from the vinyl chloride and vinyl acetate introduced into the reaction. This corresponds to a conversion rate of 84% by weight.

After vacuum filtration of the copolymer suspension and drying, a copolymer powder containing 13% by weight vinyl acetate was obtained in which the particles had an average diameter of 150 μ and a coefficient of viscosity of 60.

After 500 hours of continuous operation, the proces was stopped. The very thin film of copolymer covering the walls of the column represented only 0.019% by weight based upon the weight of vinyl chloride and vinyl acetate introduced into the reaction.

EXAMPLE 4

Preparation of the seed latex:

45 kg vinyl chloride, 90 g lauroyl peroxide, 450 g sodium dodecylbenzene sulfonate and water were introduced with the water present in an amount to provide a vinyl chloride concentration of 45% by weight. The mixture was homogenized to a fine suspension and the fine suspension was thereafter placed into an autoclave of 120 liter capacity. The fine suspension was heated at 52°C under autogeneous pressure for 12 hours. Heating was stopped and the unreacted vinyl chloride removed by degassing.

A yield of 88% by weight based upon the vinyl chloride used was obtained, i.e., the latex produced had a vinyl chloride concentration of 41.8% by weight, the particles of which had an average diameter of 0.3 μ.

Discontinuous polymerization in fine suspension:

Into an autoclave of 120 liter capacity, introduction was made of 33.5 kg of the seed latex containing 14 kg of polyvinyl chloride, 41.25 kg vinyl chloride, 25.25 kg water and 0.450 kg sodium dodecylbenzene sulfonate.

This gave:
a seeding ratio of 0.25,
a concentration of vinyl chloride + polyvinyl chloride of the seeding latex of 55% by weight based on the total fine suspension,
a catalyst percentage of 0.057% based on the total vinyl chloride used (monomer + monomer of the seed latex, by taking into account the unreacted 12%).

The mixture was heated to 52°C under autogeneous pressure and maintained at this temperature for 10 hours. The heating was stopped and the unreacted vinyl chloride removed by degassing. A latex was obtained having a density of 1175, containing 50 kg polyvinyl chloride, i.e., a concentration of 52% by weight of which 14 kg was derived from the seed product and 36 kg from the vinyl chloride introduced into the reaction. This corresponds to a real conversion rate of 87% by weight based upon the vinyl chloride put into the reaction. The average diameter of the polyvinyl chloride particles was 0.46 μ and the coefficient of viscosity was 140.

The thin film of polymer formed on the walls of the autoclave represents only 0.036% by weight of the vinyl chloride introduced into the reaction.

By way of comparison, polyvinyl chloride was prepared by discontinuous polymerization with 0.057% by weight lauroyl peroxide based upon the vinyl chloride but without the intervention of a seed latex and by operation with a monomer concentration of 40% by weight. In order to obtain the same conversion rate of 87%, the polymerization was continued for 25 hours. Furthermore, the formation of crusts represented 0.2% by weight of the monomer or five times as much as that detected in the preparation of the same amount of polymer in accordance with the practice of this invention.

EXAMPLE 5

Preparation of seed latex:

400 kg vinyl chloride, 6 kg lauroyl peroxide, 8 kg sodium dodecylbenzene sulfonate and water were mixed with the water present in an amount to provide a vinyl chloride concentration of 45% by weight. The mixture was homogenized in order to obtain a very fine dispersion which was introduced into an autoclave having 1,000 liter capacity. The mixture was heated at 48°C under autogeneous pressure. After the pressure fell, in about 7 hours of heating at 48°C, the mixture was cooled and degassed. The obtained latex had a polyvinyl chloride concentration of 41.5% by weight. The particles had an average diameter of about 0.10 $\mu$.

Continuous polymerization in fine suspension:

A polymerization autoclave of 150 liter capacity is fitted with inlets for the seeding latex, vinyl chloride and water and an outlet for the formed fine suspension, and a stirrer was used. The autoclave was filled with a latex of polyvinyl chloride from a preceding operation and the latex was heated to 52°C after which the ingredients were introduced continuously with the following hourly flow:

12 kg vinyl chloride,
0.15 kg sodium laurate,
11.4 kg water,
seed latex in an amount to provide a seed ratio of 0.04.

This gave:
a concentration in vinyl chloride + polyvinyl chloride from the seed latex of 50% by weight based upon the total fine suspension;
a catalyst percentage of 0.07% by weight based upon the total vinyl chloride used.

The fine suspension was maintained at 52°C under autogeneous pressure. The removal of the formed latex was carried out continuously. Hourly, a latex containing 11 kg polyvinyl chloride was collected, i.e., a concentration of 47.5% by weight of which 0.5 kg was derived from the seed product and 10.5 kg from the vinyl chloride used, which corresponds to a conversion rate of 87.5%.

After 300 hours of operation, the weight of fine film which collected on the walls was only 0.03% of the vinyl chloride put into the reaction. The average diameter of particles in the latex was 0.26 $\mu$.

The latex obtained was subjected to the following treatment: namely, coagulation, heat treatment at 90°–95°C, vacuum filtration, washing and drying. The polymer obtained was particularly suitable for the manufacture of rigid tubing by extrusion.

It will be understood that the procedures for preparation of the seed product in each of the examples was repeated when necessary to supply the amounts needed for introduction into the polymerization or copolymerization process.

It will be apparent from the foregoing that we have provided a simple, efficient and continuous process for the preparation of vinyl chloride polymers and copolymers whereby maximum product of good quality was produced in minimum time with minimum materials and without the formation of incrustations on the walls of the reactor of the type and amounts heretofore experienced.

It will be understood that changes may be made in the details of formulation and operation without departing from the spirit of the invention, especially as defined in the following claims.

We claim:

1. A process for suspension and fine suspension polymerization of unsaturated monomers, at least 50% by weight of which is vinyl chloride, comprising the steps of preparing a seed product by polymerizing an aqueous medium containing less than 37% by weight monomer for suspension polymerization or by homogenizing and polymerizing an aqueous medium containing less than 47% by weight monomer for fine suspension polymerization, in the presence of a water-insoluble, monomer-soluble catalyst in an amount in excess of the amount required for polymerization of the seed mixture, said catalyst having a half-life such that the catalyst consumed in the preparation of the seed product is between 5 to 50% of the total catalyst used, combining said seed product, the polymer particles of which contain the excess catalyst, with a mixture consisting essentially of water and monomer in a reaction zone in amounts to provide a polymerization medium in which water constitutes the continuous phase containing less than 50% monomer plus polymer from the seed product for suspension polymerization and less than 60% monomer plus polymer from the seed product for fine suspension polymerization in a weight ratio of polymer in the seed product to the monomer or mixtures of monomers plus polymer from the seed product of 0.01 to 0.5 and polymerizing the resulting mixture at a temperature within the range of 10° to 85°C.

2. The process as claimed in claim 1 in which the materials are introduced into the reaction zone in a continuous fashion and in which the polymer is continuously withdrawn from the reaction zone as product.

3. The process as claimed in claim 1 in which the amount of catalyst introduced in the preparation of the seed mixture is within the range of 0.1 to 3% by weight of the monomers.

4. The process as claimed in claim 1 in which the ratio of destroyed catalyst, during preparation of the seed mixture, ranges from 5–50% by weight of the catalyst used.

5. The process as claimed in claim 1 in which the seed mixture contains a dispersing agent in an amount within the range of 0.05 to 2% by weight of the monomer for suspension and within the range of 0.3 to 4% by weight of the monomer for fine suspension polymerization.

6. The process as claimed in claim 1 in which particles of the seed mixture have an average size within the range of 20 to 200 $\mu$ for the suspension and 0.05 to 1.5 $\mu$ for the fine suspension.

7. The process as claimed in claim 1 in which the temperature of polymerization is within the range of 40° to 80°C.

8. The process as claimed in claim 1 in which the temperature for polymerization of the seed mixture is within the range of 10° to 85°C.

9. The process as claimed in claim 1 wherein the total amount of polymer of the seed product and the monomers introduced to the reaction zone before polymerization is such that the concentration of said polymer and said monomers in water is within the range of 20 to 50% by weight of the reaction mixture for polymerization in suspension and within the range of 20 to 60% by weight of the reaction mixture for polymerization in fine suspension including the water content of the seed product.

* * * * *